United States Patent [19]

Lehmacher

[11] 4,378,268

[45] Mar. 29, 1983

[54] APPARATUS FOR STACKING AND BLOCKING BAGS

[76] Inventor: Hans Lehmacher, Im Hummerich, 5216 Niderkassel-Mondorf, Fed. Rep. of Germany

[21] Appl. No.: 226,416

[22] Filed: Jan. 19, 1981

[30] Foreign Application Priority Data

Jan. 17, 1980 [DE] Fed. Rep. of Germany ....... 3001475

[51] Int. Cl.$^3$ ............................................. B32B 31/00
[52] U.S. Cl. ...................................... 156/558; 156/299; 156/563; 270/47; 270/60; 493/204
[58] Field of Search ............... 156/556, 558, 559, 563, 156/513–515, 299; 493/203, 204; 270/47, 53, 60

[56] References Cited

U.S. PATENT DOCUMENTS

| 3,460,823 | 8/1969 | Neal et al. | 270/47 X |
| 3,791,267 | 2/1974 | Brooks | 270/60 X |
| 4,342,564 | 8/1982 | Lehmacher | 493/204 |

FOREIGN PATENT DOCUMENTS 2500964  7/1976  Fed. Rep. of Germany .

Primary Examiner—David A. Simmons

Attorney, Agent, or Firm—Karl F. Ross

[57] ABSTRACT

An apparatus for stacking flattened-out bags has a stacking drum rotatable in one rotational sense about a stacking drum axis at a stacking station which subdivides a conveyor into an upstream stretch that feeds the flattened-out bags one at a time to the drum and a downstream stretch which carries the stacks of bags away from the station. A pressure drum at the station is rotatable in the opposite directional sense about an axis parallel to that of the stacking drum. An axially extending array of generally radially extending pickup needles is provided on the stacking drum pointed forwardly in the respective rotational sense. An axially extending pusher bar is provided on the pressure drum and at least one spot welder is also provided on this pressure drum adjacent the pusher. The drums are rotated in the respective senses at the same peripheral speed which is generally equal to the transport speed of the sheets so as to engage the sheets as same arrive at the station between the needles and the pusher bar and to weld each sheet with the underlying sheet. A radially displaceable stripper element is provided on the stacking drum immediately upstream of the needles for pushing a welded-together stack or pad from the stacking drum.

10 Claims, 3 Drawing Figures

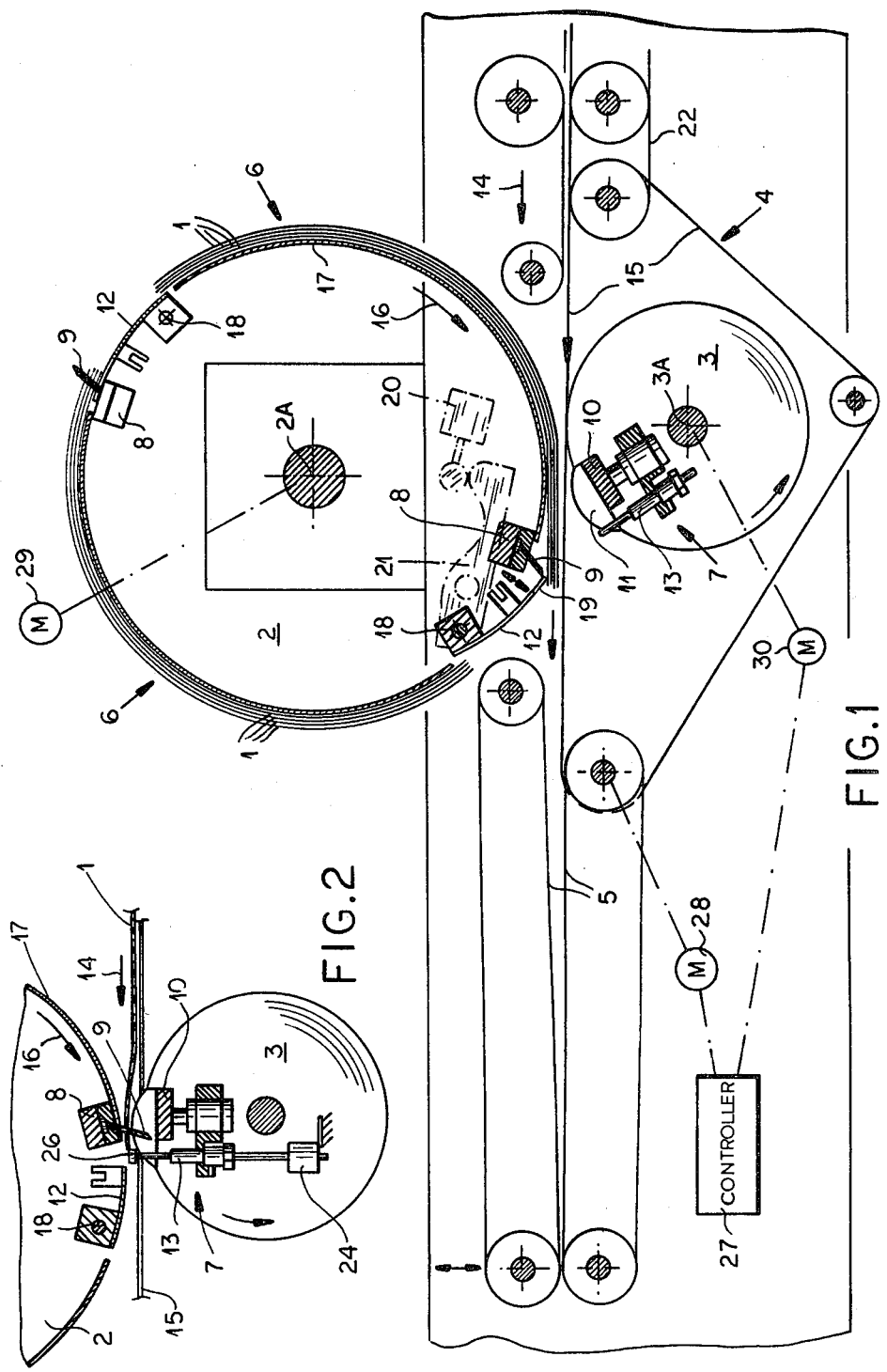

APPARATUS FOR STACKING AND BLOCKING BAGS

FIELD OF THE INVENTION

The present invention relates to an apparatus for stacking and blocking bags. More particularly this invention concerns such an apparatus which forms a neat stack of flattened bags, normally of thermoplastic synthetic-resin material, and which then blocks together this stack, that is secures the bags at least one location to one another so that they form an easy-to-handle block.

BACKGROUND OF THE INVENTION

Bags, such as made in accordance with my earlier patent application No. 127,064 filed Mar. 4, 1980, are normally delivered to the consumer in so-called blocks. Such a block is a stack of bags which are adhered together so that the stack can be handled easily. The bags can be ripped one after the other off the block much like sheets of paper from a pad.

A standard apparatus for forming such blocks or pad-stacked bags is described in German Patent Document No. 2,500,964. Such an arrangement has a conveyor divided at a stacking location into an upstream stretch which delivers the flattened-out bags or sheet workpieces one at a time to the location and a downstream stretch which carries away stacks of bags. A pair of drums flank this location. One of the drums is provided with an axially extending array of needles which are directed slightly forwardly in the direction of rotation of the drum and the other drum is provided with a complementarily grooved pusher bar. The two drums are rotated at the same peripheral speed, which is the same as the transport speed for the conveyor, and the operation is so synchronized that the needles poke through the leading end of each bag as it arrives at the location. The needles are rather long so that as the stacker drum having these needles rotates it can pick up a small stack of the bags. Periodically a stripper element pushes all of these bars off the drum so that they can be carried away by the downstream conveyor stretch. Somewhere along this downstream conveyor stretch a soldering tool or the like is provided which welds together the bags of an individual stack at several different locations so as to form the above-described block or pad.

The principal disadvantage of this system is that the bags in the stacks formed by the stacker drum frequently shift somewhat relative to one another during their transport to the blocking or welding location. The only way to avoid this shifting is to operate at relatively low speed, a method which obviously cuts down productivity.

OBJECTS OF THE INVENTION

It is therefore an object of the present invention to provide an apparatus for stacking and blocking together flat sheet workpieces such as bags made of a thermoplastic synthetic resin.

Another object is to provide such an apparatus which can operate at relatively high speed.

SUMMARY OF THE INVENTION

These objects are attained according to the instant invention in an apparatus of the above-described general type but wherein the pressure drum itself is provided with at least one spot welder that secures the bags together before they are stripped from the stacker drum. Thus any shifting of the bags is impossible, since by the time the stack is stripped from the stacking drum the entire stack of bags pierced on the needles will be blocked together.

The spot welder according to this invention can simply be fixed on the pusher drum so as weld the most recently picked up bag to the underlying bag. It is also possible to make this welder radially reciprocal and to operate it synchronously with the stripping element so that it welds together all of the bags of a given stack in one operation before this stack is stripped from the stacking drum. An axially extending row of spaced-apart such welders may be provided to form a plurality of spot welds, or the spot welders may all be connected to a single heat-transmitting bar which forms an elongated line weld.

According to yet another feature of this invention the spot welders are simply automotive-type glow plugs, such as used in a diesel engine. Thus this addition to the standard stacking apparatus can be made at extremely low cost, and the critical wear-prone part can be replaced by a stock item.

DESCRIPTION OF THE DRAWING

FIG. 1 is a side partly sectional and partly schematic view showing the apparatus according to this invention;

FIG. 2 is a view similar to FIG. 1 showing a slightly different apparatus in a slightly different operative position.

SPECIFIC DESCRIPTION

Figure 3:
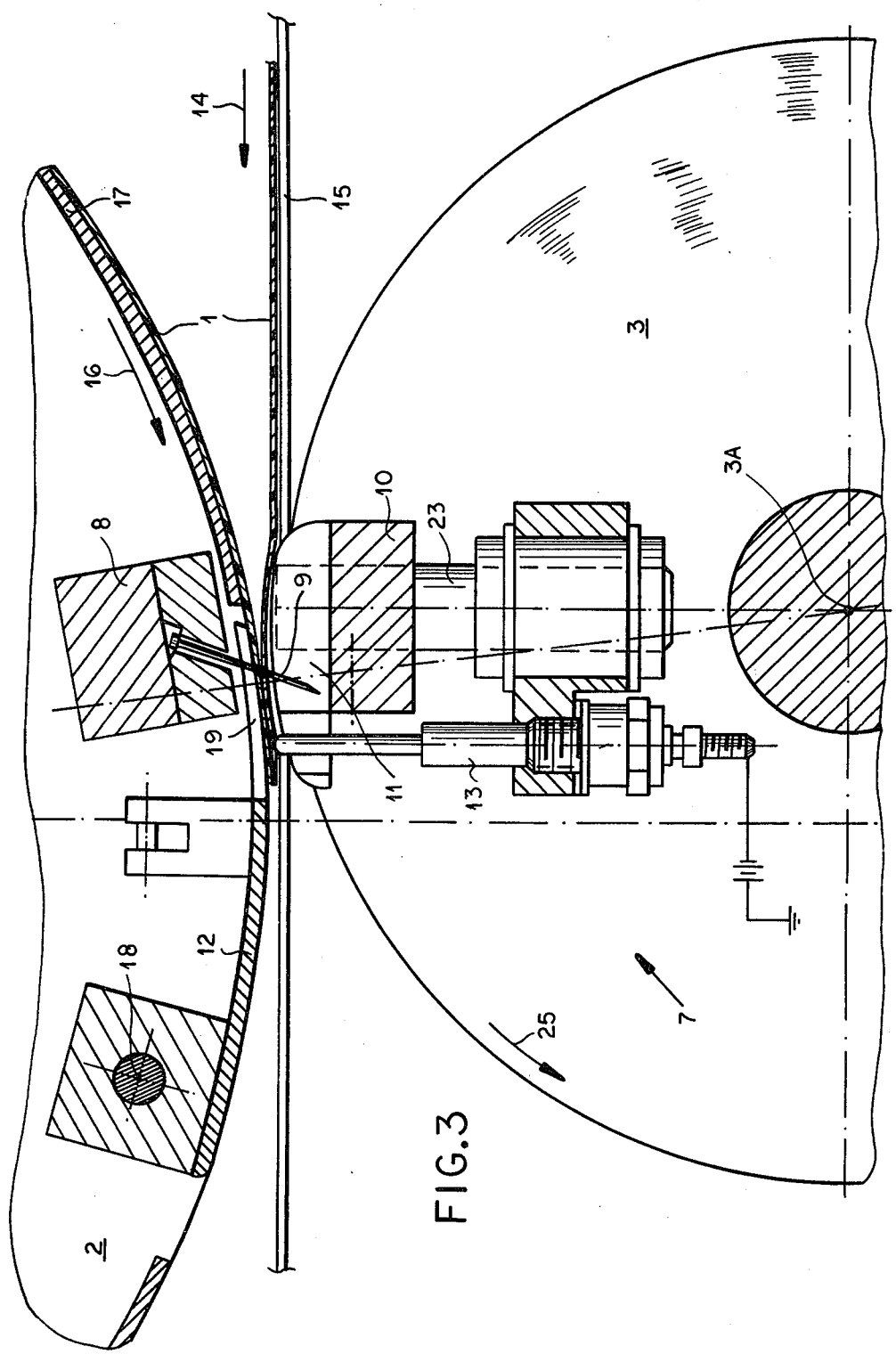
FIG. 3 is a view showing the apparatus of FIG. 1 in the position of FIG. 2.

The instant invention is intended to operate in conjunction with a standard machine which produces a succession of flattened plastic bags 1. The main elements of this apparatus are carried on a stacking drum 2 rotatable about an axis 2A and on a pusher drum 3 rotatable about an axis 3A. A conveyor indicated generally at 4 has upstream belts 22 which deliver the bags 1 to the station formed by the drums 2 and 3, a plurality of belts 15 which carry the bags 1 into the nip between the rollers 2 and 3 and which carry stacks 6 away from this nip, and downstream belts 5 which carry away the stacks 6.

The stacker drum 2 carries a pair of diametrically opposite axially extending holders 8 each of which carries an array of needles 9 pointed forwardly in the direction 16 of rotation of the drum 2.

The pusher drum 3 carries a single mechanism 7 comprising a pusher bar 10 formed with slots 11 into which fit the needles 9 as shown in FIG. 3 and which can move radially on a shaft 23 urged outwardly by a not-illustrated spring, and an array of axially spaced spot welders 13 here constituted as simple glow plugs and connected to a power source indicated schematically.

Relative to the direction of rotation 25 of the drum 3 the spot welders 13 lie ahead of the bar 10.

In addition provided ahead of each holder bar 8 and array of needles 9 in the direction 16 is a stripper plate 12 whose outer surface forms a continuation of the cylindrical outer surface 17 of the drum 2, and which extends backwardly past the needles 9 which are received in notches 19 in the rear edge of the stripper plate 12. The stripper plate 12 can rotate about an axle 18 under the force of a lever 21 operated by a solenoid 20. Thus when this stripper element 12 is cammed outwardly it will push the leading end of a stack 6 off the needles 9.

The belts 15 are spaced apart to allow the spot welders 13 and needles 9 to engage the bags 1 between them. In addition the rotation directions 16 and 25 are opposite for the drums 2 and 3, respectively, but are such that the peripheral speeds of these two elements are the same and are the same as the advance speed in the conveyor direction 14 for the bags 1.

Thus with the system according to the instant invention as each bag 1 arrives at the nip between the rollers 2 and 3 its leading edge will be pierced by the needles 9 and it will be picked up, to wrap around the outer surface 17 of the drum 2 as it rotates about the axis 2A. The next bag 1 will be picked up by the diametrically opposite needles 9 and the next bag 1 after that will be picked up by the same array of needles 9, overlying the bag 1 picked up on the previous rotation. The spot welders 13 will form small spot welds at the leading edges of the bags 1 to adhere them to one another at these leading edges as the bags are picked up. Thus the finished stack 6 of bags 1 will have all of the leading edges of the bags 1 welded together at an axially extending row of spots to make a block or pad of the bags. The bags can therefore not go out of alignment with one another as they are transported away.

FIG. 2 shows an arrangement wherein the spot welders 13 have their upper ends all connected to a bar 26. In addition these spot welders 13 can be radially displaced by means of a solenoid 24. With such an arrangement, therefore, the leading edges of all of the bags 1 of a single stack 6 are spot-welded together immediately before being stripped off the drum 2 by the stripper element 12.

A single controller 27 operates motors 28 for the drive 4, 29 for the drum 2, and 30 for the drum 3. Such a controller can be relatively unsophisticated, as it need merely get the various speeds synchronous. Once the machine is operating properly it can be set to move at extremely high speed according to the instant invention as relative displacement of the bags 1 in the stacks 6 is impossible.

I claim:
1. An apparatus for stacking sheets, said apparatus comprising:
a stacking drum rotatable in one rotational sense about a stacking-drum axis at a stacking station;
conveyor means having an upstream stretch for feeding said sheets one at a time at a transport speed to said drum at said station and a downstream stretch for carrying stacks of said sheets away from said station;
a pressure drum at said station rotatable in the opposite rotational sense about a pressure-drum axis generally parallel to said stacking-drum axis;
an axially extending array of generally radially extending pickup needles on said stacking drum pointed forwardly in said one sense;
an axially extending pusher bar on said pressure drum;
at least one spot welder on said pressure drum adjacent said pusher bar thereof;
drive means connected to said conveyor means and to both of said drums for rotating said drums in the respective senses at a peripheral speed generally equal to said transport speed for engaging said sheets as same arrive at said station between said needles and said pusher bar and for welding each sheet with said welder to an underlying sheet;
a radially displaceable stripper element on said stacking drum adjacent said needles thereof; and
actuating means connected to said stripper element for periodically displacing same outwardly and stripping a stack of sheets carried by said needles from said needles.

2. The apparatus defined in claim 1 wherein said pusher bar is formed with a plurality of axially spaced recesses in each of which one of said needles is engageable.

3. The apparatus defined in claim 2 wherein said spot welder is fixed on said pusher drum.

4. The apparatus defined in claim 2, further comprising means for radially displacing said spot welder on said pusher drum.

5. The apparatus defined in claim 2 wherein a plurality of such welders are provided on said pusher drum in an axially extending row.

6. The apparatus defined in claim 5 wherein said spot welders carry an axially extending welding bar that forms an axially extending weld along said sheets.

7. The apparatus defined in claim 5 wherein said welders are each a standard motor-vehicle glow plug.

8. The apparatus defined in claim 1 wherein said stripper element is ahead in said one sense of said array and is pivotal on said stacking drum about a pivot axis parallel to said axes.

9. The apparatus defined in claim 1 wherein said stacking drum has two such angularly equispaced arrays and stripper elements.

10. The apparatus defined in claim 1 wherein said conveyor means includes a plurality of conveyor belts spaced axially apart and interleaved with said needles.

* * * * *